Patented Mar. 19, 1940

2,194,013

UNITED STATES PATENT OFFICE 2,194,013

LAMINATED SAFETY GLASS

Brook J. Dennison, Aspinwall, Pa., assignor to Pittsburgh Plate Glass Company, Allegheny County, Pa., a corporation of Pennsylvania No Drawing. Application April 30, 1938, Serial No. 205,359

8 Claims. (Cl. 49—92)

The present invention relates to laminated safety glass and more particularly to improvements in the plastic materials normally incorporated into safety glass.

The primary object of the invention is the provision and use of a new class of plasticizers for the reinforcing interlayer material of safety glass which will enable the preparation of laminated plates having great resistance to shattering over a wide temperature range and which will insure a product meeting in every way the other requirements of safety glass suitable for commercial application.

Other objects and advantages of the invention will become more apparent from the following detailed description of certain embodiments thereof.

Laminated safety glass is ordinarily composed of two sheets of glass bonded together by a layer of a tough, flexible transparent, thermoplastic material. In certain instances, the use of additional layers of cement is necessary to insure a satisfactory union between the separate laminae of the composite plate. The general trend at present, however, is to obviate the necessity of cements by employing thermoplastic resinous materials for the interlayer.

The widest use of laminated glass is naturally in automobiles and commercial vehicles wherein the safety glass will be exposed to a wide range of temperatures varying from about 20 degrees below to 120 degrees above zero F. Manifestly, therefore, it is necessary that the laminated plates exhibit a good resistance to shattering over this entire temperature range and at the same time the bond between the plastic interlayer and the glass be unaffected by temperature variations over a period of years.

Research chemists have provided a large number of plastics, such as the cellulosic compounds, acrylates, and methacrylates, vinyl esters, vinyl acetals and other synthetic resins suitable for use in safety glass. These plastic materials, however, require the addition of modifying agents before they may be used in the manufacture of safety glass.

A disadvantage of a majority of the presently known plasticizers lies in the fact that the plastics with which they are combined exhibit markedly different characteristics with variations in temperature. For example, when a plasticizer is added to a particular plastic to increase the strength of a laminated plate containing such plastic at low temperatures, the plate will be weakened at high temperatures. The converse is also true, that is, a laminated plate prepared for service at high temperatures is generally lacking in strength and unsatisfactory when exposed to low temperatures.

Briefly stated, the present invention contemplates the use of compounds produced by the esterification of glycols and substituted glycols containing an ether linkage and at least one hydroxyl group with certain free acids or mixtures thereof derived from coconut oils as plasticizers for those plastic materials adapted for use in safety glass. It is further contemplated to use these compounds in combination with themselves, or with other plasticizing agents in order to produce an even larger number of effects in the physical characteristics of the modified plastics.

The plasticizing agents are esters in which the alcohol base comprises the glycols broadly including di and tri methylene glycol, the mono, di, tri and poly ethylene glycols, and butylene glycols wherein are present two hydroxyl groups capable of esterification, and the substituted glycols containing an ether linkage and at least one hydroxyl group, such as the oxy alcohols, or as more commonly known methyl, ethyl, butyl and benzyl cellosolve. The acids used in the esterification reaction are those free acids obtained by the saponification acidification and distillation of coconut oils. At the present time no single pure acid has been obtained from coconut oils, but it has been found that upon fractional distillation the product having an acid number of from 360 to 395 and boiling over a range of from 115 to 165 degrees C. at 13 mm. pressure may be used in the esterification reaction to produce highly satisfactory plasticizers. Although the product having a boiling range of from 120 to 153 degrees C. at 13 mm. of pressure may be used, it is preferred to employ a narrower fraction having an acid number of from 385 to 395 and boiling over a range of from 125 to 135 degrees C. at 13 mm. pressure. It is believed that the exceptional merit of these esters as plasticizers is due at least to a substantial degree to the fact that the acids comprise mixtures in which the various components or certain of them coact to produce results not attainable by the use of single acids.

The preparation of the esters may be accomplished by any of the standard processes which are so well known as to make unnecessary a detailed description here. The class of plasticizers herein set forth may be used to modify a large number of plastics, including cellulose nitrate, ethyl cellulose, methyl acrylate, ethyl acrylate, methyl methacrylate, ethyl methacrylate, vinyl acetate, vinyl chloracetate and the vinyl acetal resins. It will be observed that all of these plastics have been used heretofore in the preparation of safety glass.

The amount of plasticizer incorporated with the plastic material may be varied through a range of 15 to 50 per cent, depending upon the physical characteristics which it is desired to impart to the plastic and the nature of the plastic. Larger percentages of plasticizer render the plastic soft and elastic while low percentages of plasticizer will leave the plastic relatively hard and rigid. It is also true that the amounts of plasticizer will vary according to the nature of the plastic with which it is blended. For example, from 20 to 50 per cent of plasticizer may be admixed with cellulose nitrate, although approximately 30 per cent of plasticizer will produce a plastic most suitable for use as the interlayer in safety glass. Likewise, from 30 to 60 per cent of plasticizer may be used with ethyl cellulose, 35 per cent being the optimum, where the ethyl cellulose is to be used in safety glass; 10 to 30 per cent with vinyl acetate, 18 per cent optimum; 15 to 35 per cent with vinyl chloracetate, 25 per cent optimum; 15 to 45 per cent with the acrylates and methacrylates, 25 per cent optimum; and 25 to 45 per cent with the vinyl acetal resins, 32 per cent optimum, where the resin is a plasticized incomplete vinyl acetal substantially equivalent to that obtained by treating from 2½ to 8 moles of polyvinyl alcohol with 1 mole of a saturated aliphatic straight chain aldehyde such as butyraldehyde.

The plasticizers may be used singly or in various combinations with themselves, or with other plasticizers. The ratio between the mixed plasticizers may vary within wide limits and equally good effects are obtained when either constituent predominates. Typical examples of the mixed plasticizers comprise:

Per cent
1. Coconut oil acid ester of monoethylene glycol_____ 26
   Triethylene glycol dihexoate_____ 74
2. Coconut oil acid ester of triethylene glycol_ 28
   Triethylene glycol dihexoate_____ 72
3. Coconut oil acid ester of triethylene glycol_ 50
   Coconut oil acid ester of benzyl cellosolve_ 54
4. Coconut oil acid ester of butyl cellosolve_ 64
   Triethylene glycol dihexoate_____ 36

Many other combinations are of course possible. Particularly effective results have been obtained by using a mixture having the percentage composition of Example 2, approximating 35 per cent by weight of the total mixture of plasticizer and plastic.

The particular plasticizer selected may be incorporated with the plastic material by any suitable means and the mixture manipulated to insure complete plasticization of the plastic. For example, the plastic and plasticizer may be blended through the use of a mutual solvent and the modified plastic retained in fluid form until it is applied to the glass sheets. Or if it is preferred, the plasticizer may be incorporated with the plastic material by mechanical manipulation and the modified plastic formed into sheets by extruding the mixture under pressure.

Where the modified plastic is applied to the glass sheets as a highly viscous liquid, due to its retention of the solvent, the solvent must be removed before the lamination is completed. In the case the modified plastic is prepared in sheet form and applied to the glass, this curing or seasoning step is not necessary. The laminating operation is preferably similar to that disclosed in United States Patent No. 1,781,084, wherein the separate laminae are assembled and subjected to controlled heat and pressure in an autoclave to complete the lamination. Ordinarily a pressure of approximately 150 pounds per square inch at a temperature of approximately 225 degrees F. will yield the desired results. The exact conditions will vary somewhat depending upon the particular plastic incorporated in the safety glass and in some instances the plastic will be soft and adhesive without the use of additional heat.

It will be obvious that although these new plasticizers will serve to add increased strength and elasticity to the disclosed class of plastic materials, it does not necessarily follow that the modified plastics will in every case exhibit such an adhesion to glass that the customary cements may be discarded. For example, where a modified cellulose nitrate sheet is incorporated into a laminated plate, it may still be necessary to use one of the recognized cements to complete a satisfactory bond between the glass and cellulosic sheets. Where, however, an acrylate or vinyl acetal resin is used as the interlayer these materials will in themselves possess the adhesive properties necessary to effect a satisfactory and permanent bond between the glass and resin interlayer.

The improved interlayer material is particularly adapted to impart a greater resistance to breakage to safety glass containing the modified plastics, both at high and low temperatures. The standard break test as known and practiced by those skilled in the art was utilized in numerous tests and provided conclusively the greater strength of laminated glass in which the plastic interlayer was plasticized with the compounds included herein in the amounts specified. For example, a laminated plate in which a polymerized incomplete vinyl acetal resin plasticized with the coconut oil acid ester of triethylene glycol formed the reinforcing interlayer, withstood the impact of a ½ pound ball dropping 50 feet when the plate was at a temperature of 120° F., and the resistance at zero degrees F. to a similar impact was equivalent. Other break tests on laminated plates, the reinforcing interlayers of which contained different plastics modified by the different plasticizers were of the same magnitude.

The resistance to breakage of laminated plates formed in accordance with the provisions of my invention therefore affords a high safety factor over a wide temperature range which has never before been equalled. Accordingly, the use of this improved safety glass in automobiles and commercial vehicles will afford a new and greater measure of protection to the passengers therein.

The esters which are employed as plasticizers may be obtained as practically colorless compounds. They are also inert and are not decomposed by exposure to actinic light. They exhibit a strong plasticizing action and because of their low vapor pressure guarantee their retention by the plastic inner layer, a feature which insures the strength of laminated plates for a long period of years. The coconut oil acids themselves being derived from a natural product can be obtained at a relatively low cost and therefore the esters prepared from these acids will be much cheaper than most plasticizing agents prepared synthetically.

It is to be understood that the advantages accredited to my improved product are obtained without sacrificing any of the other requirements of commercially acceptable laminated glass. The adhesion, durability and resistance to moisture of the laminated plates is not only retained at the maximum now possible with the various plastics, but is in fact in some instances increased.

It will be obvious that various modifications may be resorted to and different embodiments added without departing from the spirit of my invention or the scope of the appended claims.

What I claim is:

1. A laminated plate comprising two sheets of glass bonded together by a layer of synthetic thermo plastic material modified by the incorporation therewith of a plasticizer selected from the group consisting of the compounds produced by the esterification of the ethylene glycols and the substituted glycols containing an ether linkage and at least one hydroxyl group with a mixture of free acids derived from coconut oils.

2. A laminated plate comprising two sheets of glass bonded together by a layer of synthetic thermo plastic material modified by the incorporation therewith of a plasticizer selected from the group consisting of the compounds produced by the esterification of the ethylene glycols and the substituted glycols containing an ether linkage and at least one hydroxyl group with a mixture of free acids derived from coconut oils, the mixture having an acid number of from 360 to 395 and boiling over a range of from 115 to 165 degrees C. at 13 mm. pressure.

3. A laminated plate comprising two sheets of glass bonded together by a layer of synthetic thermo plastic material capable of plasticization modified by the incorporation therewith of a plasticizer selected from the group consisting of the compounds produced by the esterification of the ethylene glycols and the substituted glycols containing an ether linkage and at least one hydroxyl group with a mixture of free acids derived from coconut oils, the mixture having an acid number of from 385 to 395 and boiling over a range of from 125 to 135 degrees C. at 13 mm. of pressure.

4. A laminated plate comprising two sheets of glass bonded together by a layer of synthetic thermo plastic material selected from the group consisting of cellulose nitrate, ethyl cellulose, methyl acrylate, ethyl acrylate, methyl methacrylate, ethyl methacrylate, vinyl acetate, vinyl chloracetate and the vinyl acetal resins, the plastic layer being modified by the incorporation therewith of a plasticizer selected from the group consisting of the compounds produced by the esterification of the ethylene glycols and the substituted glycols containing an ether linkage and at least one hydroxyl group with a mixture of free acids derived from coconut oils.

5. A laminated plate comprising two sheets of glass bonded together by a layer of synthetic thermo plastic material selected from the group consisting of cellulose nitrate, ethyl cellulose, methyl acrylate, ethyl acrylate, methyl methacrylate, ethyl methacrylate, vinyl acetate, vinyl chloracetate and the vinyl acetal resins, the plastic layer being modified by the incorporation therewith of a plurality of plasticizers at least one of which is selected from the group consisting of the compounds produced by the esterification of the ethylene glycols and the substituted glycols containing an ether linkage and at least one hydroxyl group with a mixture of free acids derived from coconut oils.

6. A laminated plate comprising two sheets of glass bonded together by a layer of synthetic thermo plastic material selected from the group consisting of cellulose nitrate, ethyl cellulose, methyl acrylate, ethyl acrylate, methyl methacrylate, ethyl methacrylate, vinyl acetate, vinyl chloracetate and the vinyl acetal resins, the plastic layer being modified by the incorporation therewith of from 10 to 50 per cent by weight of a plasticizer selected from the group consisting of the compounds produced by the esterification of the ethylene glycols and the substituted glycols containing an ether linkage and at least one hydroxyl group with a mixture of free acids derived from coconut oils.

7. A laminated plate comprising two sheets of glass bonded together by a layer of a polymerized incomplete vinyl acetal resin modified by the incorporation therewith of from 25 to 45 per cent by weight of a plasticizer selected from the group consisting of the compounds produced by the esterification of the ethylene glycols and the substituted glycols containing an ether linkage and at least one hydroxyl group with a mixture of free acids derived from coconut oils.

8. A laminated plate comprising two sheets of glass bonded together by a layer of a polymerized incomplete vinyl acetal resin substantially equivalent to that obtained by treating from 2½ to 8 moles of polyvinyl alcohol with 1 mole of butyraldehyde, the resin being modified by the incorporation therewith of approximately 32 per cent by weight of the ester produced from tri ethylene glycol and a mixture of free acids derived from coconut oil, the mixture of acids having an acid number of from 385 to 395 and boiling over a range of from 125 to 135 degrees C at 13 mm. pressure.

BROOK J. DENNISON.